(12) United States Patent
Smith

(10) Patent No.: US 8,708,374 B1
(45) Date of Patent: Apr. 29, 2014

(54) CONCRETE SEALING RING FOR SET SCREW ELECTRICAL FITTINGS OR CONNECTORS

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 13/476,742

(22) Filed: May 21, 2012

(51) Int. Cl.
  *F16L 11/118* (2006.01)

(52) U.S. Cl.
  USPC .................. 285/151.1; 285/150.1; 285/154.3; 285/154.4; 285/404; 29/525.11

(58) Field of Classification Search
  USPC .......... 285/151.1, 150.1, 154.1, 149.1, 154.3, 285/154.4, 404; 29/518, 525.01, 525.02, 29/525.11
  See application file for complete search history.

(56) References Cited

U.S. PATENT DOCUMENTS

| | | | | |
|---|---|---|---|---|
| 2,100,824 A | * | 11/1937 | Wayman | 285/151.1 |
| 2,770,668 A | * | 11/1956 | Appleton | 285/154.1 |
| 2,827,509 A | * | 3/1958 | Wayman | 285/151.1 |
| 3,405,958 A | * | 10/1968 | Holdren | 285/404 |
| 3,454,291 A | * | 7/1969 | Eidelberg et al. | 285/151.1 |
| 3,951,436 A | * | 4/1976 | Hyde, Jr. | 285/404 |
| 3,993,330 A | * | 11/1976 | Goransson | 285/151.1 |
| 4,194,768 A | * | 3/1980 | Gretz | 285/151.1 |
| 5,068,494 A | * | 11/1991 | Bolante | 285/149.1 |
| 5,165,735 A | * | 11/1992 | Nardi et al. | 285/404 |
| 6,106,031 A | * | 8/2000 | Guginsky | 285/151.1 |
| 7,438,327 B2 | | 10/2008 | Auray et al. | 285/151.1 |

\* cited by examiner

*Primary Examiner* — David E Bochna

(74) *Attorney, Agent, or Firm* — Fattibene and Fattibene LLC; Paul A. Fattibene

(57) ABSTRACT

A sealing ring having a flexible ring body and a front and rear seal separated by a channel and a set screw recess adjacent one end. The sealing ring is placed on the end of a set screw electrical fitting or connector and forms a seal between the body of the set screw electrical fitting or connector and the exterior surface of an electrical conduit. The sealing ring prevents concrete from entering a gap formed between the body of the set screw electrical fitting or connector and an electrical conduit during pouring of concrete. Concrete entering the gap may interfere with electrical connections.

20 Claims, 7 Drawing Sheets

CONCRETE SEALING RING FOR SET SCREW ELECTRICAL FITTINGS OR CONNECTORS

FIELD OF THE INVENTION

The present invention relates in general to electrical fittings or connectors, and more particularly to a sealing ring for setscrew type electrical fittings use in poured concrete applications.

BACKGROUND OF THE INVENTION

Electrical conduits and fittings often need to be embedded in concrete. The electrical fittings, boxes, and rigid conduits are often put into place prior to pouring the concrete. Once the concrete is poured, it is often very difficult to make any changes or corrections to the conduits, boxes, and fittings. Often, a problem arises in that around the electrical fittings and their attachment to boxes or the conduit there may be small openings or gaps through which concrete may enter. As a result, problems may arise in running conductors through the electrical conduit or wires that have been installed may be damaged. This often results in problems running conductors and with making electrical connections.

In order to prevent the concrete from entering gaps between the electrical conduit and the electrical fittings or connectors, electrical tape or other tape is typically required to be wrapped around an end of the electrical fitting adjacent the electrical conduit in an effort to seal any small gaps or openings. While this helps prevent the poured concrete from entering the electrical conduits, electrical fittings, or electrical boxes attached thereto, often the tape will fail or not be adequately wrapped to prevent the poured concrete from entering. Also, due to the pressure of the concrete even if the tape appears wrapped appropriately, it may often fail resulting in the concrete entering between the electrical fitting and the electrical conduit and filling up the interior of the conduit.

Additionally, the wrapping of tape around each of the electrical fittings and electrical conduits is very time consuming and depends on a large extent upon the skill of the individual wrapping the electrical fitting and electrical conduit. Any error or failure of the wrapping of the tape or tape itself will result in a substantial problem and construction delay if the poured concrete damages or blocks the electrical conduit or the electrical boxes connected thereto so as to prevent electrical conductors from being pulled. Therefore, there is a need for a device or system that can easily and securely seal openings or gaps between an electrical fitting and a electrical conduit that is inexpensive, easily installed, and reliable.

SUMMARY OF THE INVENTION

The present invention comprises a flexible sealing ring having a front and rear seal and a channel there between for connecting to a typical set screw type electrical fitting. The flexible ring has a set screw recess along one edge and is placed over a set screw electrical fitting or connector prior to assembly of the set screw electrical fitting or connector to an electrical conduit. A channel formed within the sealing ring between a front and rear seal is adapted to mate with a flange on the set screw electrical fitting or connector electrical conduit receiving end. The front seal seals the opening between the sealing ring and the exterior surface of the electrical conduit and the rear seal seals the opening between the body of the set screw fitting or connector and the sealing ring. The sealing ring may be placed on the set screw electrical fitting or connector prior to assembly of the electrical conduit. The electrical conduit may be either rigid electrical conduit or electrical metallic tubing or EMT.

In one embodiment the front seal of the sealing ring has an extension. The extension provides additional sealing over a portion of the circumference when the set screw is tightened forcing the electrical conduit away from a portion of the front seal.

It is an object of the present invention to prevent concrete from entering a set screw electrical fitting or connector during the pouring of concrete.

It is another object of the present invention to save time and effort in the placement of electrical rigid conduit and electrical fittings or connectors.

It is an advantage of the present invention that it may be placed over the electrical conduit receiving end of a conventional set screw electrical fitting or connector.

It is another advantage of the present invention that it is securely held onto the set screw electrical fitting or connector.

It is yet another advantage of the present invention that it can be placed on the set screw electrical fitting or connector prior to connecting to a rigid conduit.

It is yet another advantage of the present invention that it can be placed on different types of set screw electrical connectors or fittings, including steel set screw electrical connectors or fittings.

It is a feature of the present invention that the sealing ring is flexible, facilitating attachment to a set screw electrical fitting or connector.

It is another feature of the present invention that a channel placed between a front and rear seal securely holds the sealing ring onto the set screw electrical fitting or connector.

It is yet another feature of the present invention that a front seal seals the opening around an exterior surface of a rigid conduit and the rear seal seals against a body portion of the set screw electrical fitting or connector.

It is another feature of an embodiment of the present invention that an extension of the front seal improves sealing when the set screw is tightened adjacent an electrical conduit.

These and other objects, advantages, and features will become more readily apparent in view of the following more detailed description.

DETAILED DESCRIPTION OF THE PREFERRED EMBODIMENT

Figure 1:
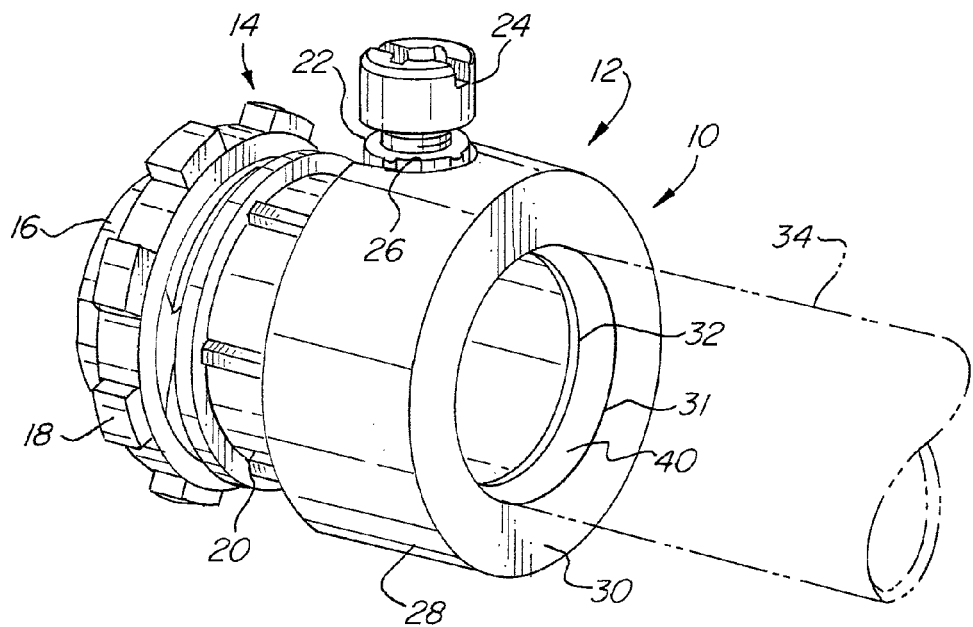
FIG. 1 is a perspective view illustrating the sealing ring assembly of the present invention.

FIG. 1 is a perspective view illustrated the sealing ring assembly 10. A sealing ring 12 is placed over one end of a set screw electrical connector 14 that receives a electrical conduit 34. The other end of the set screw electrical connector 14 has a threaded end 16. Threaded on the threaded end 16 is a lock nut 18. Body 20 separates the threaded end 16 from the end on which the sealing ring 12 is attached. Placed on the body 20 adjacent one end of the set screw electrical connector 14 is a threaded boss 22. Threaded within the threaded boss is a set screw 24. The set screw 24 passes through the body 20 and extends into the inner bore of the set screw electrical connector 14. The set screw 24 is used to retain the electrical conduit 34, illustrated in phantom, within the body 20 of the set screw electrical connector 14. Placed on the end adjacent the threaded boss 22 is the sealing ring 12. The sealing ring 12 has a flexible ring body 28. The sealing ring 12 and flexible ring body 28 may be made of any rubber, plastic, or elastomer type material, provided it is sufficiently flexible and strong. Additionally, the material should not react or be damaged by concrete or cement. The ring body 28 has a set screw recess 26 extending inward from one edge. The ring body 28 has a front bevel diameter 31 and a front opening diameter 32 forming a front bevel 40 there between.

Figure 2:
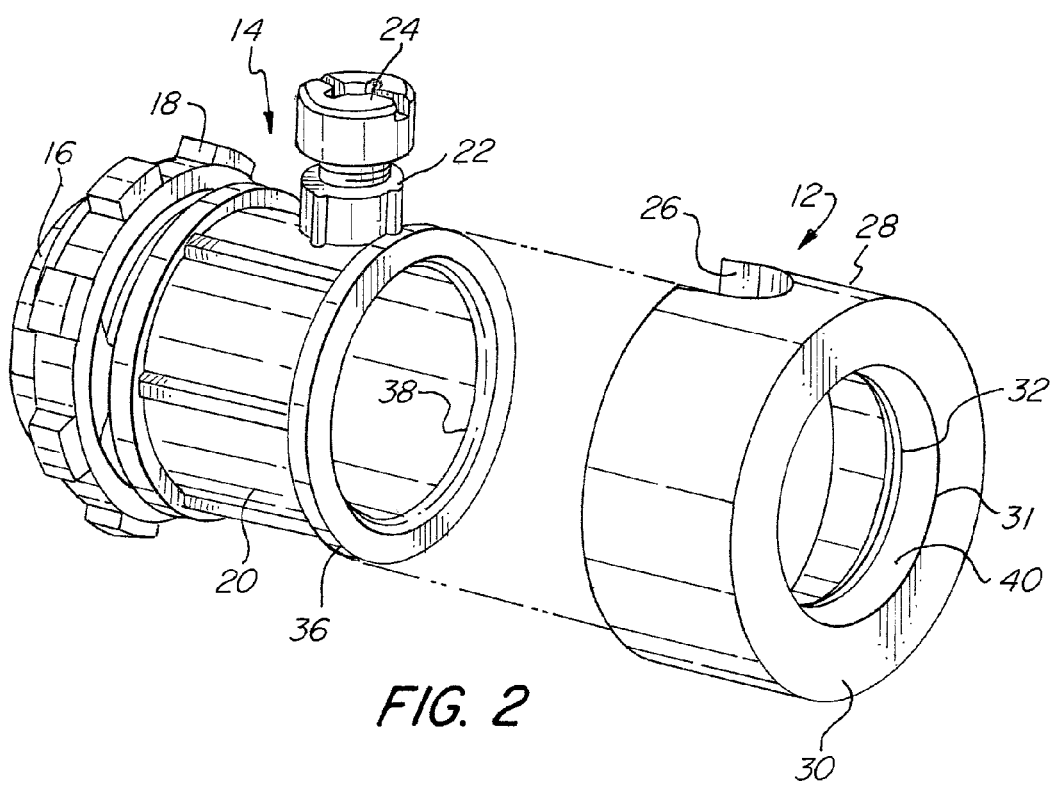
FIG. 2 is a perspective exploded view illustrating the sealing ring separated from the set screw electrical fitting or connector.

FIG. 2 more clearly illustrates the electrical connector opening 38 and the outwardly extending flange 36 formed adjacent the electrical connector opening 38. The electrical conduit opening 38 forms an electrical conduit receiving end of the set screw electrical connector 14. The boss 22 holding the set screw 24 is also more clearly illustrated.

Figure 3:
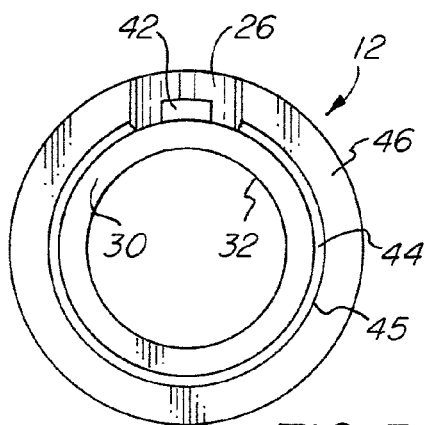
FIG. 3 is a rear elevational view of the sealing ring.

FIGS. 3-7 more clearly illustrate the detailed structure of the sealing ring 12. In FIG. 3 the rear end of the sealing ring 12 is more clearly illustrated. The set screw recess 26 has a recess 42 formed therein. Recess 42 helps to fit over ridges formed in the set screw electrical connector 14. The rear end 46 has a rear beveled diameter 45 forming a rear bevel 44. The front opening diameter 32 is formed in the front end wall 30 as seen through the rear bevel diameter 45.

Figure 4:
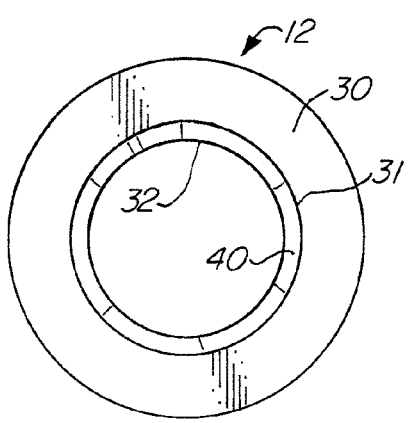
FIG. 4 is a front elevational view of the sealing ring.

FIG. 4 more clearly illustrates the front of the sealing ring 12. A front bevel 40 is formed between the front bevel diameter 31 and the front opening diameter 32 formed in the front end wall 30.

Figure 5:
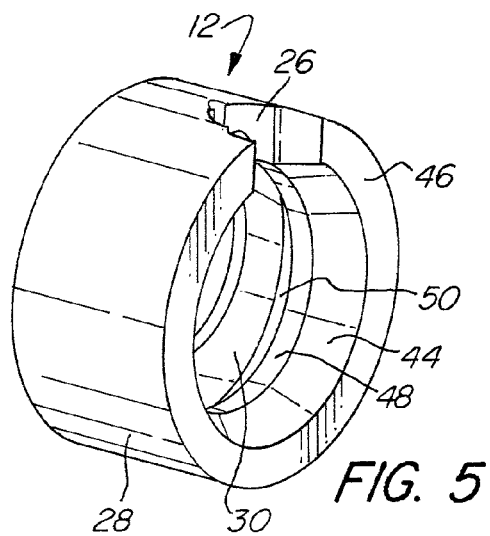
FIG. 5 is a rear perspective view of the sealing ring.

FIG. 5 is a rear perspective view of the sealing ring 12 more clearly illustrating the interior configuration. Rear bevel 44 extends inward from the rear end 46 and is adjacent a rear seal 48. Adjacent rear seal 48 is a channel 50. Adjacent one wall of the channel 50 is front end wall 30.

Figure 6:
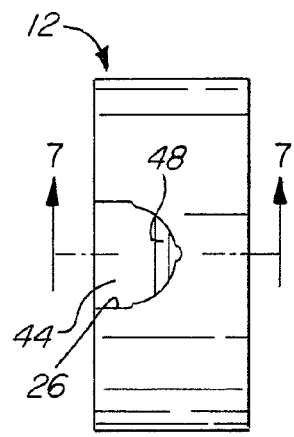
FIG. 6 is a top plan view of the ceiling ring.

FIG. 6 is a top plan view of the sealing ring 12 in which the rear bevel 44 and the rear seal 48 can be seen through the set screw recess 26.

Figure 7:
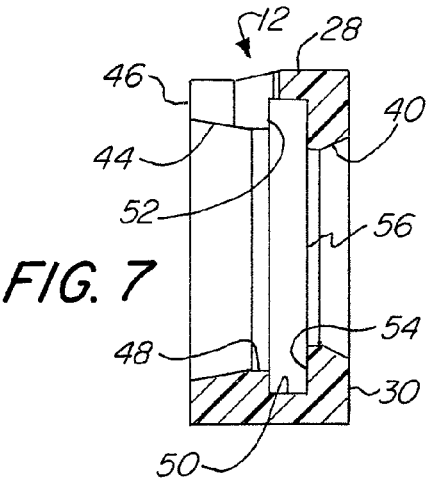
FIG. 7 is a cross-section taken along line 7-7 in FIG. 6.

FIG. 7 is a cross-section taken along line 7-7 in FIG. 6. FIG. 7 more clearly illustrates the structure and relationship of the different features contained within the sealing ring 12. Progressing from the front end wall 30 inward, the front bevel 40 extends to the front seal 56. Adjacent the front seal 56 is the front channel wall 54 forming a portion of the channel 50. The rear channel wall 52 forms the other portion of the channel 50 and is placed adjacent the rear seal 48. Adjacent the other side of the rear seal 48 is rear bevel 44 which extends to the rear end 46 of the sealing ring 12. Accordingly, as clearly illustrated in FIG. 7, the channel 50 is placed between the front seal 56 and the rear seal 48. The front bevel 40 aids in the introduction of an electrical conduit and the rear bevel 44 aids in the placement of the sealing ring onto a set screw electrical fitting or connector. The front seal 56 seals against the exterior surface of an electrical conduit and the rear seal 48 seals against the exterior surface of a set screw electrical fitting or connector.

Figure 8:
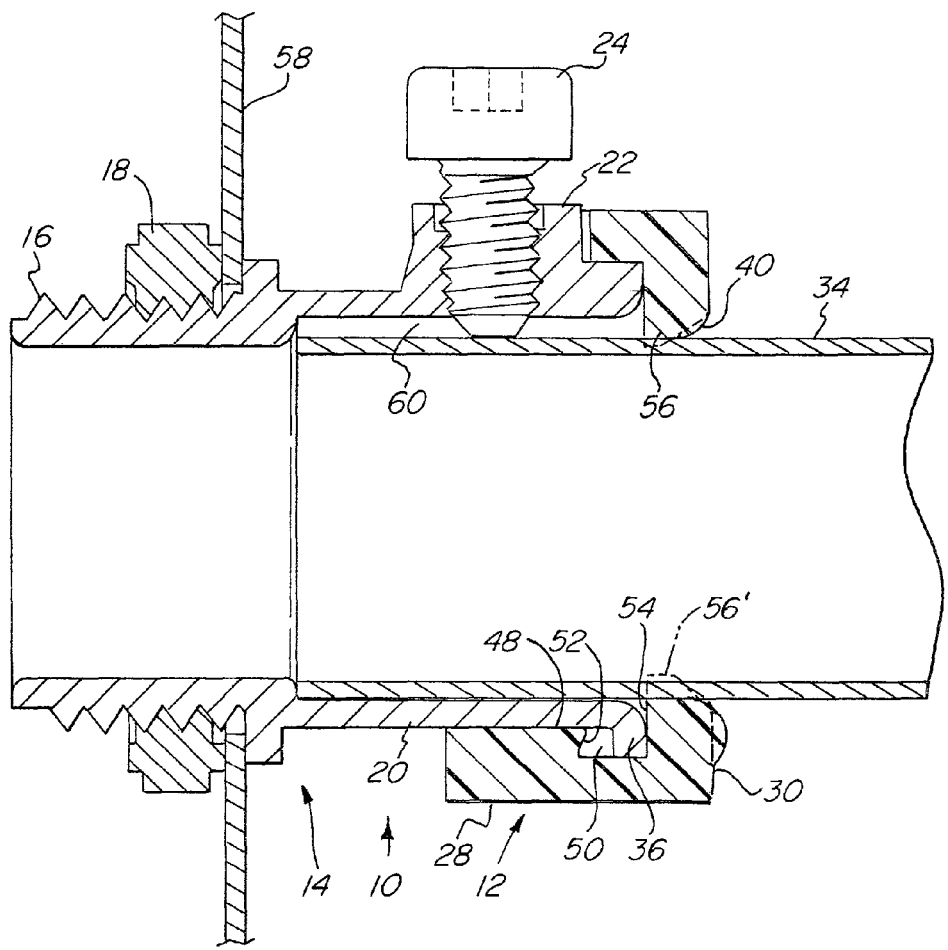
FIG. 8 is a cross-section of the sealing ring of the present invention placed on a set screw electrical connector and electrical conduit.
Figure 9:
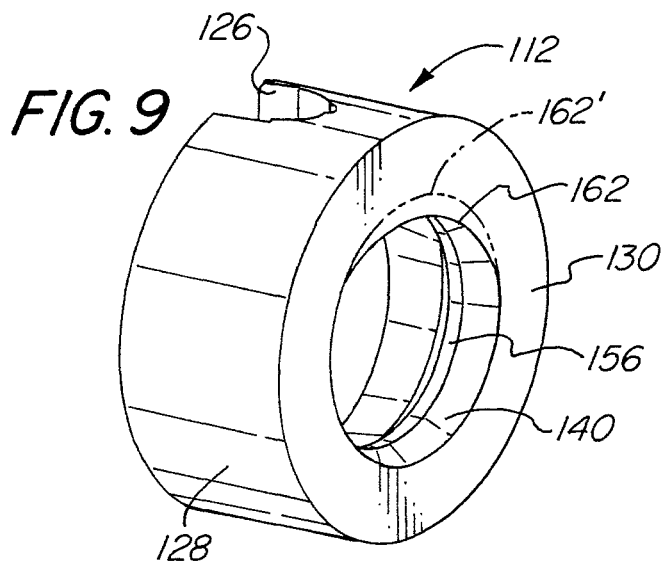
FIG. 9 is a front perspective view of another embodiment of a sealing ring of the present invention illustrating a front seal extension.
Figure 10:
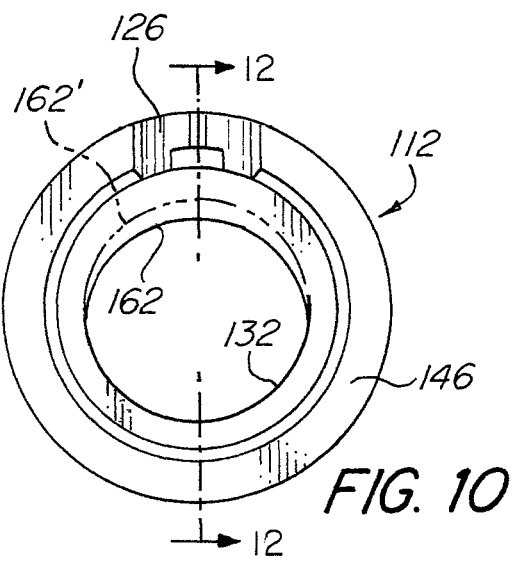
FIG. 10 is a rear elevational view of the other embodiment of a sealing ring of the present invention.

FIG. 8 is a cross-section illustrating the sealing ring assembly 10 and the placement of the sealing ring 12 onto a set screw electrical connector 14. The set screw electrical connector 14 is illustrated attached to an electrical box wall 58 by tightening lock nut 18 on threads 16. The sealing ring 12 and flexible ring body 20 is placed on an end of the set screw electrical connector 14 and held thereon by the flange 36 on the electrical connector 14. The flange 36 is positioned within the channel 50 between the front channel wall 54 and the rear channel wall 52 of the sealing ring 12. The front seal 56 is illustrated with the initial front seal location 56', illustrated in phantom. The front seal 56 and 56' provide a tight and secure seal around the outer diameter of the electrical conduit 34. Rear seal 48 is illustrated compressed against the body 20 of the set screw electrical fitting or connector 14. The pressure of the set screw 24 pushing against the outer diameter of the electrical conduit 34 often creates an enlarged gap 60 between the exterior surface of electrical conduit 34 and the body 20 adjacent the set screw 24. However, the front seal 56 generally has an inward radial distance sufficient to assure a good seal adjacent the electrical conduit 34.

FIGS. 9-12 illustrate another embodiment of the present invention. In this embodiment of the present invention, the front opening is oblong rather than circular and has a front seal extension located at a circumferential portion on the same side as or adjacent to the set screw recess.

As illustrated in FIGS. 9-12, sealing ring 112 has a set screw recess 126 formed within the ring body 128. The ring body 128 has a front end wall 130 having a front opening 132 that is oblong. A front bevel 140 is formed adjacent the front opening 132. The front bevel 140 is adjacent the front seal 156. Also formed as a portion of the front seal 156 is a front seal extension 162 that when compressed may move to the front seal extension 162', illustrated in phantom. The front seal extension 162 may extend around a circumferential portion of the front seal 156 or opening 132. The circumferential portion may range from between ninety and one-hundred and eighty degrees. The front seal extension 162 preferably extends inward a maximum radial distance adjacent the set screw recess 126 and diminishes in inwardly extending radial distance as the extension progresses circumferentially away from the set screw recess 126. The set screw recess 126 extends axially inward from the rear end 146.

Figure 12:
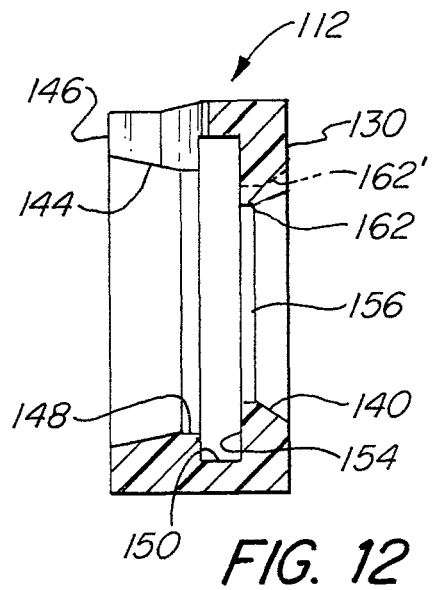
FIG. 12 is a cross-section of the other embodiment of the sealing ring of the present invention taken along line 12-12 in FIG. 10.
Figure 11:
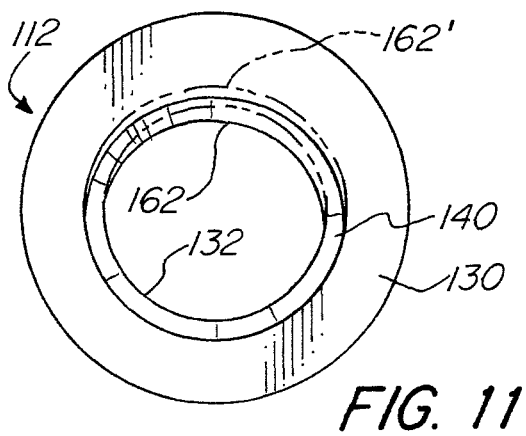
FIG. 11 is a front elevational view of the other embodiment of the sealing ring of the present invention.

FIG. 12 more clearly illustrates the structure and arrangement of the sealing ring 112. Extending from the front end wall 130 inward is front bevel 140. Adjacent the front seal 156 which is integrally formed therein is the front seal extension 162 with the front seal extension compressed location illustrated as 162', in phantom. The channel 150 is formed between the front seal 156 and the rear seal 148. Rear bevel 144 extends from the rear seal 148.

Figure 13:
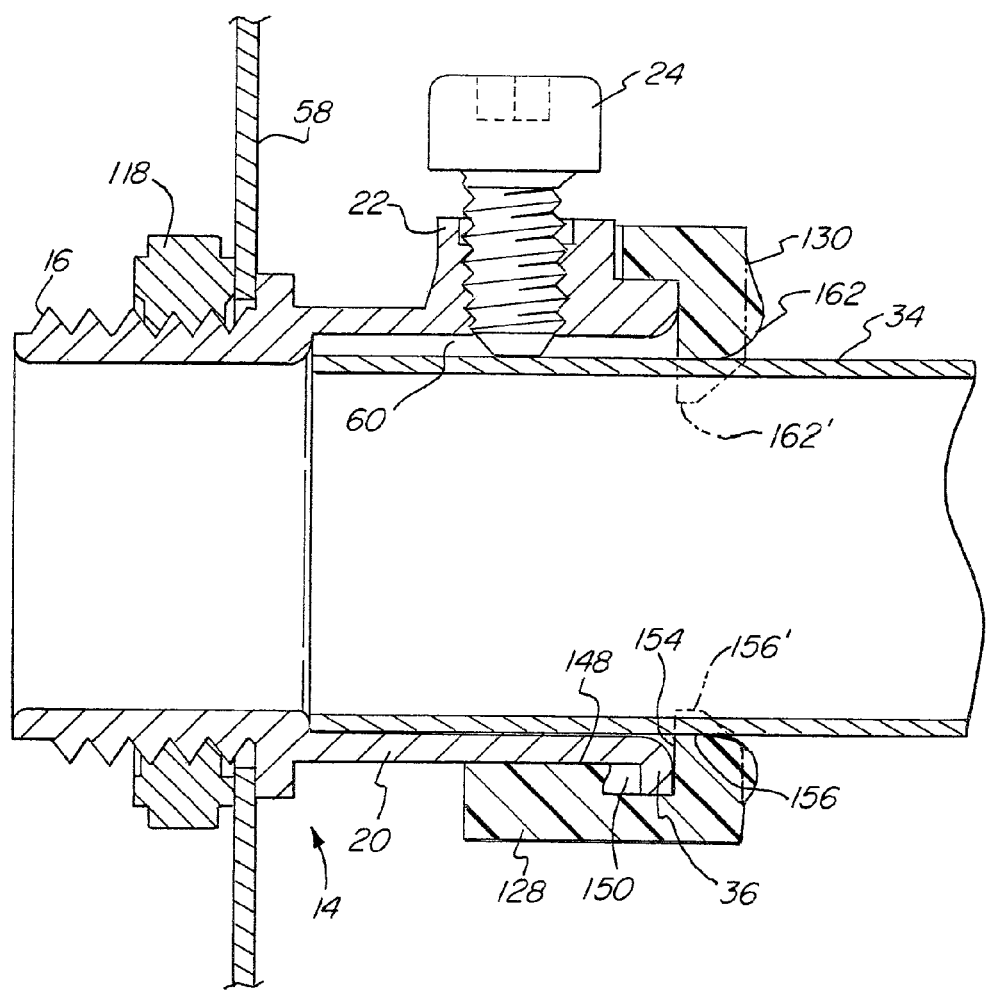
FIG. 13 is a cross-section of the other embodiment of the present invention placed on a set screw electrical connector and electrical conduit.

FIG. 13 is a cross-section more clearly illustrating the sealing ring 112 placed on a set screw electrical connector 14. The front seal extension 162 and the front seal extension extended location 162', illustrated in phantom, are more clearly illustrated in FIG. 13. The front seal extension 162 and 162' help to insure that the gap 60 formed between the interior surface of body 20 of the set screw electrical connector 14 and the exterior surface of rigid conduit 34 is adequately sealed. This is helpful due to the set screw 24 pushing down on the rigid conduit 34 which may widen the gap 60. The front seal extension 162 assures that even through the gap 60 is widened, the front seal extension 162 will be sufficient to seal any gap preventing concrete from entering. FIG. 13 also more clearly illustrates the compression of the front seal 156 from its original location illustrated as 156', in phantom, and the compression of rear seal 148 adjacent the body 20 of the set screw electrical connector 14.

Figure 14:
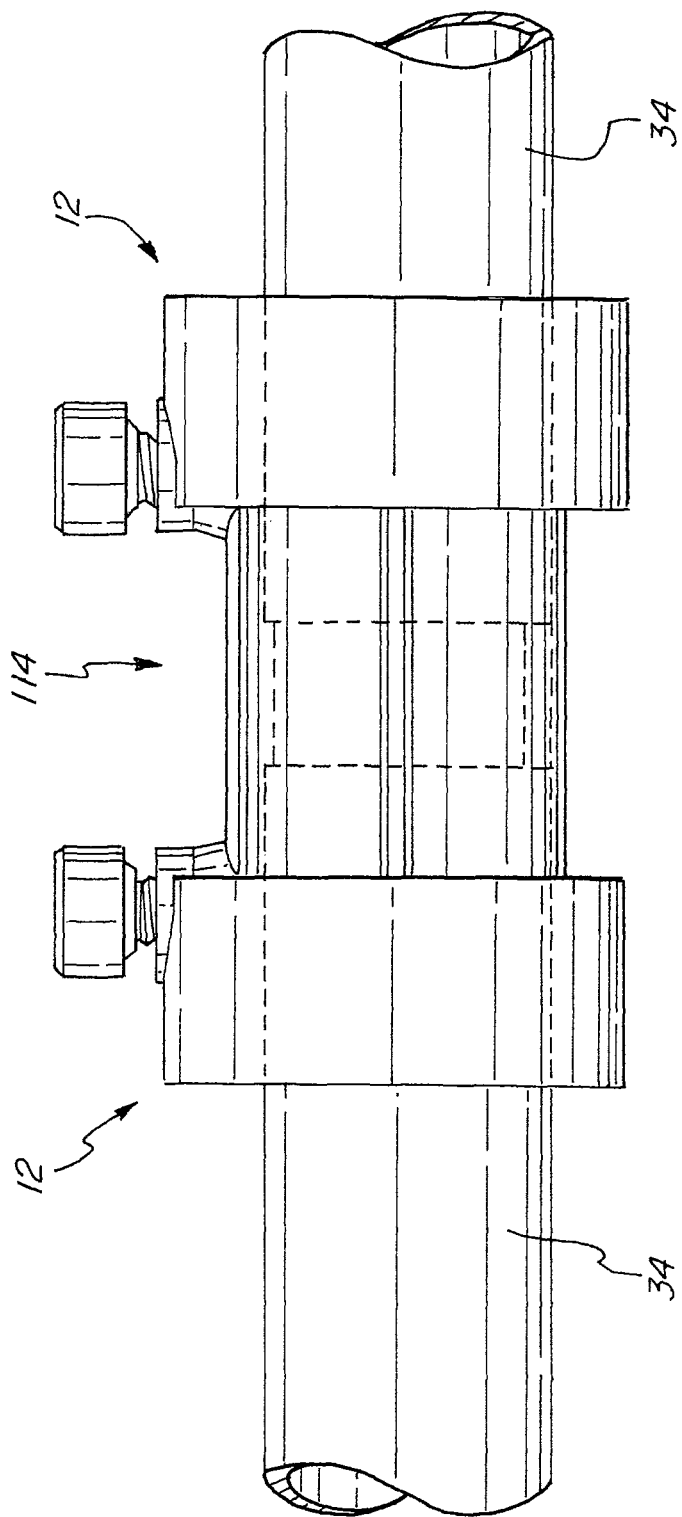
FIG. 14 is an elevational view illustrating sealing rings of the present invention attached to a set screw electrical coupler connecting two electrical conduits together.

FIG. 14 illustrates the application of the present invention to a set screw electrical coupler. Sealing rings 12 are placed on either end of a set screw electrical coupler 114. The set screw electrical coupler 114 has end portions with a structure similar to that of the set screw electrical connector 14 illustrated in FIGS. 1, 2, 8, and 13. The set screw coupler 114 is used to attach ends of electrical conduit 34 together.

Figure 15:
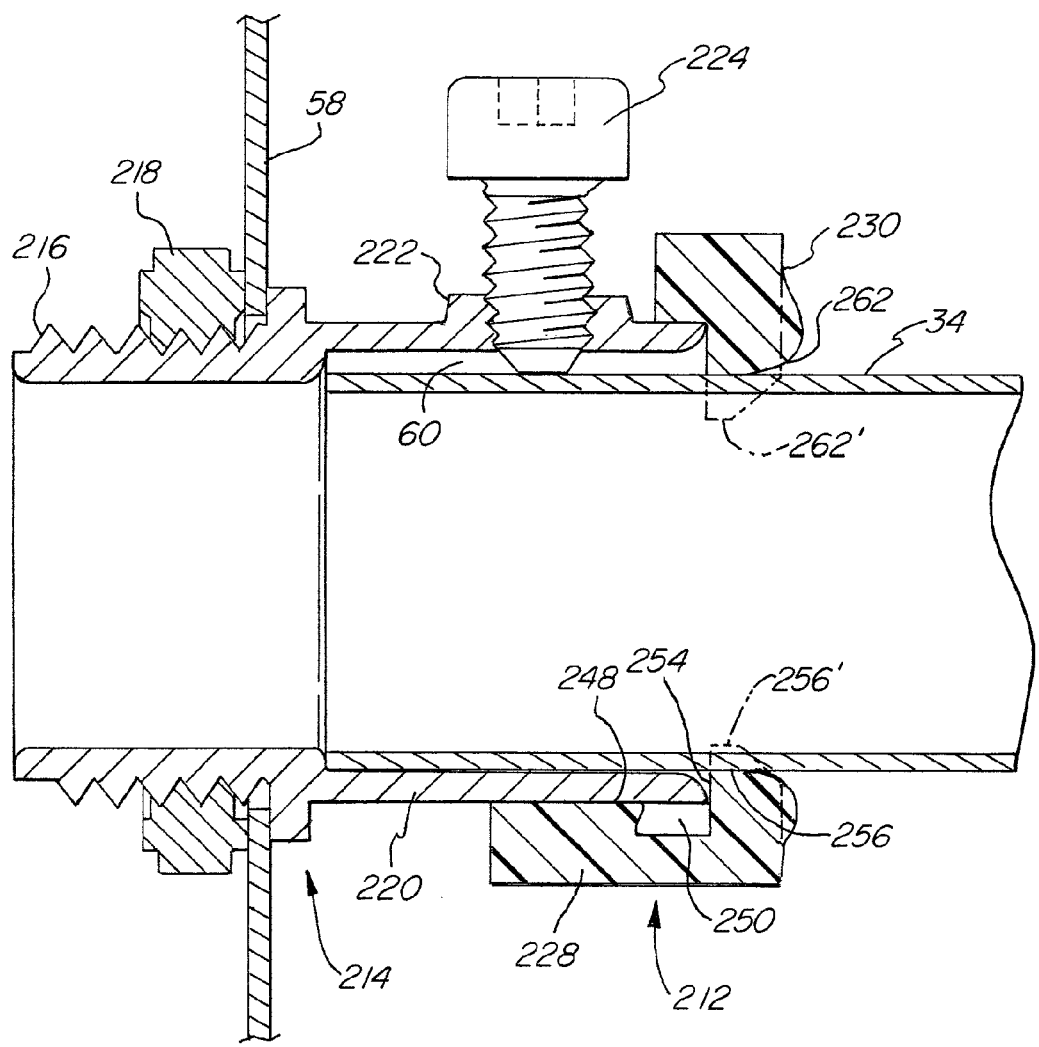
FIG. 15 is a cross-section of the other embodiment of the present invention placed on a steel set screw electrical connector and electrical conduit.

FIG. 15 illustrates an embodiment of the invention placed on a steel set crew electrical connector. FIG. 15 is a cross-section illustrating a sealing ring 212 placed on a steel set screw electrical connector 214. The steel set screw electrical connector 214 is similar to the set screw electrical connector 14, illustrated in FIG. 13, however, the steel set screw electrical connector 214 does not have a flange 36 and has a smooth surface body. The steel set screw electrical connector 214 has a threaded end 216 having a locknut 218 for securing against the electrical box wall 58. Generally, a steel body 220 has a smooth cylindrical surface without any ribs, and has relatively thin walls. Formed on the steel body 220 is a threaded boss 222. The sealing ring 212 has a ring body 228 and a front end wall 230. The front seal extension 262 and the front seal extension extended location 262', illustrated in phantom, are illustrated placed on the steel body 220 of the steel set screw electrical connector 214. The front seal extension 262 and 262' help to insure that the gap 60 formed between the interior surface of body 220 of the steel set screw electrical connector 214 and the exterior surface of electrical conduit 34 is adequately sealed. This is helpful due to the set screw 224 pushing down on the rigid conduit 34 which may widen the gap 60. The front seal extension 262 assures that even through the gap 60 is widened, the front seal extension 262 will be sufficient to seal any gap preventing concrete from entering. FIG. 15 also clearly illustrates the compression of the front seal 256 from its original location illustrated as 256', in phantom, and the compression of rear seal 248 adjacent the body 220 of the steel set screw electrical connector 214. In this embodiment, the channel 250 is illustrated, but may not be needed because the steel set screw electrical connector 214 does not have a flange. However, the channel 250 may assist the rear seal 248 in deforming and sealing between the body 220.

From the above description of the invention it is apparent that the invention greatly facilitates the speed and consistency of laying electrical conduit in a way to assure that when concrete is poured there will be little likelihood that concrete will enter the electrical conduit. This speeds up construction and reduces cost, while at the same time improving the quality of the construction. Additionally, the sealing ring of the invention can be easily installed with little skill or training, and yet provides consistent reliable results.

While the present invention has been described with respect to several different embodiments, it will be obvious that various modifications may be made without departing from the spirit and scope of this invention.

What is claimed is:

1. A sealing ring for use with an electrical connector and electrical conduit comprising:
   a flexible ring body having a front end wall and a rear end;
   a front seal adjacent the front end wall;
   a rear seal adjacent the rear end; and
   a set screw recess formed adjacent the rear end and extending axially inward from the rear end completely through said flexible ring body over a circumferential portion forming an opening adapted to receive a set screw on an electrical connector,
   whereby the sealing ring is placed over the end of the electrical connector preventing poured concrete from entering the electrical connector between an interior surface of the electrical connector and an exterior surface of the electrical conduit.

2. The sealing ring for use with an electrical connector and electrical conduit as in claim 1 further comprising:
   a channel placed between the front seal and the rear seal.

3. The sealing ring for use with an electrical connector and electrical conduit as in claim 1 wherein:
   the sealing ring is made of an elastomer.

4. The sealing ring for use with an electrical connector and electrical conduit as in claim 1 further comprising:
   an extension placed on said front seal extending radially inward along a circumferential portion adjacent said recess.

5. The sealing ring for use with an electrical connector and electrical conduit as in claim 4 wherein:
   said extension has an inwardly extending radial distance with a maximum inwardly extending radial distance adjacent said recess and the inwardly extending radial distance diminishes progressing circumferentially away from said recess.

6. A sealing ring for use with an electrical connector and electrical conduit comprising:
   a flexible ring body having a front end wall and a rear end;
   a front seal adjacent the front end wall;
   a rear seal adjacent the rear end;
   a recess formed adjacent the rear end;
   an extension placed on said front seal extending radially inward along a circumferential portion adjacent said recess; and
   wherein the circumferential portion ranges from between ninety and one-hundred and eighty degrees,
   whereby the sealing ring is placed over the end of an electrical connector preventing poured concrete from entering the electrical connector between an interior surface of the electrical connector and an exterior surface of the electrical conduit.

7. A sealing ring for use with a set screw electrical connector and electrical conduit for preventing poured concrete from entering comprising:
   a flexible ring body having a front end wall and a rear end;
   a front opening having a front opening diameter formed in the front end wall
   a front bevel formed in the front end wall adjacent said front opening;
   a front seal adjacent said front bevel formed in the front end wall;
   a rear opening having a rear opening diameter formed in the rear end;

a rear bevel formed in the rear end adjacent the rear opening;

a rear seal adjacent said rear bevel formed in the rear end;

a channel placed between said front seal and said rear seal, whereby a flange on the set screw electrical connector is held therein; and a set screw recess formed adjacent the rear end, whereby the sealing ring is placed over the end of a set screw electrical connector preventing poured concrete from entering the set screw electrical connector between an interior surface of a body portion of the set screw electrical connector and an exterior surface of the electrical conduit.

8. The sealing ring for use with a set screw electrical connector and electrical conduit for preventing poured concrete from entering as in claim 7 wherein:

the sealing ring is made of an elastomer.

9. The sealing ring for use with a set screw electrical connector and electrical conduit for preventing poured concrete from entering as in claim 7 wherein:

the rear opening diameter is greater that front opening diameter.

10. The sealing ring for use with a set screw electrical connector and electrical conduit for preventing poured concrete from entering as in claim 7 wherein:

said front seal has a diameter less than a diameter of said rear seal.

11. The sealing ring for use with a set screw electrical connector and electrical conduit for preventing poured concrete from entering as in claim 7 further comprising:

an extension extending radially into said front opening adjacent said set screw recess.

12. The sealing ring for use with a set screw electrical connector and electrical conduit for preventing poured concrete from entering as in claim 11 wherein:

said extension extends around a circumferential portion ranging from between ninety and one-hundred and eighty degrees.

13. The sealing ring for use with a set screw electrical connector and electrical conduit for preventing poured concrete from entering as in claim 11 wherein:

said extension has an inwardly extending radial distance with a maximum inwardly extending radial distance adjacent said recess and the inwardly extending radial distance diminishes progressing circumferentially away from said recess.

14. A set screw electrical connector and sealing ring assembly for use in electrical connections made in poured concrete comprising:

a set screw electrical connector having a flange adjacent an electrical conduit receiving end;

a sealing ring placed on the electrical conduit receiving end of said set screw electrical connector, said sealing ring comprising, a flexible ring body having a front end wall and a rear end;

a front seal adjacent the front end wall;

a rear seal adjacent the rear end;

a channel placed between the front seal and the rear seal; and a recess formed adjacent the rear end, whereby said sealing ring prevents poured concrete from entering said set screw electrical connector between an interior surface of said set screw electrical connector and an exterior surface of the electrical conduit.

15. The set screw electrical connector and sealing ring assembly for use in electrical connections made in poured concrete as in claim 14 wherein:

said sealing ring is made of an elastomer.

16. The set screw electrical connector and sealing ring assembly for use in electrical connections made in poured concrete as in claim 14 further comprising:

an extension placed on said front seal extending radially inward along a circumferential portion adjacent said recess.

17. The set screw electrical connector and sealing ring assembly for use in electrical connections made in poured concrete as in claim 16 wherein:

the circumferential portion ranges from between ninety and one-hundred and eighty degrees.

18. The set screw electrical connector and sealing ring assembly for use in electrical connections made in poured concrete as in claim 16 wherein:

said extension has an inwardly extending radial distance with a maximum inwardly extending radial distance adjacent said recess and the inwardly extending radial distance diminishes progressing circumferentially away from said recess.

19. The set screw electrical connector and sealing ring assembly for use in electrical connections made in poured concrete as in claim 14 wherein:

said set screw electrical connector comprises a coupler, whereby two opposing ends of electrical conduit are coupled together.

20. A method of sealing a gap between an electrical fitting and an electrical conduit in an electrical rigid conduit layout made in poured concrete comprising the steps of:

placing a flexible sealing ring having front end wall, a rear end, a front seal and a rear seal and a set screw recess formed adjacent the rear end and extending axially inward from the rear end completely through the flexible sealing ring over a circumferential portion forming an opening adapted to receive a set screw on a set screw electrical connector on a rigid conduit receiving end of the set screw electrical connector;

attaching the set screw electrical connector to an electrical box;

inserting an electrical conduit into the flexible sealing ring and the set screw electrical connector;

tightening a set screw securely fastening the set screw electrical fitting to the electrical conduit; and pouring concrete over the electrical box, set screw electrical fitting, and electrical conduit, whereby the flexible sealing ring prevents poured concrete from entering a gap between the set screw electrical fitting and an exterior surface of the electrical conduit.

* * * * *